United States Patent
Wagner et al.

(10) Patent No.: US 7,502,682 B2
(45) Date of Patent: Mar. 10, 2009

(54) METHOD FOR REGULATING AN ACTUAL VARIABLE OF AN INTERNAL COMBUSTION ENGINE

(75) Inventors: Horst Wagner, Stuttgart (DE); Maik Schaufler, Hohenacker (DE)

(73) Assignee: Robert Bosch GmbH, Stuttgart (DE)

( * ) Notice: Subject to any disclaimer, the term of this patent is extended or adjusted under 35 U.S.C. 154(b) by 94 days.

(21) Appl. No.: 11/702,977

(22) Filed: Feb. 5, 2007

(65) Prior Publication Data

US 2007/0219703 A1    Sep. 20, 2007

(30) Foreign Application Priority Data

Feb. 7, 2006    (DE)    ............... 10 2006 005 504

(51) Int. Cl.
*G06F 19/00* (2006.01)
*F02D 41/04* (2006.01)
*F01N 3/02* (2006.01)

(52) U.S. Cl. .................. 701/102; 701/104; 701/109; 701/110; 123/676; 60/274

(58) Field of Classification Search ......... 123/320–323, 123/672, 679, 676; 701/101–103, 109, 114, 701/115, 104, 105, 119, 111; 60/274, 276, 60/285, 599, 600–602
See application file for complete search history.

(56) References Cited

U.S. PATENT DOCUMENTS

| | | | |
|---|---|---|---|
| 4,459,669 A * | 7/1984 | Chujo et al. | 701/109 |
| 5,890,359 A * | 4/1999 | Enander | 60/274 |
| 6,725,659 B1 * | 4/2004 | Shao et al. | 60/601 |
| 6,954,693 B2 * | 10/2005 | Brackney et al. | 701/109 |
| 7,059,116 B2 * | 6/2006 | Kusada et al. | 60/285 |
| 2006/0123782 A1 * | 6/2006 | Rosin et al. | 60/599 |
| 2007/0204594 A1 * | 9/2007 | Ishii | 60/274 |
| 2008/0271452 A1 * | 11/2008 | Reynolds et al. | 60/611 |

\* cited by examiner

*Primary Examiner*—Willis R Wolfe, Jr.
(74) *Attorney, Agent, or Firm*—Kenyon & Kenyon LLP

(57) ABSTRACT

A method for regulating an actual output variable of an internal combustion engine to a reference variable. A maximum value for the reference variable is generated as a function of at least one physical variable in the exhaust system of the internal combustion engine and the reference variable is limited to this maximum value.

8 Claims, 4 Drawing Sheets

METHOD FOR REGULATING AN ACTUAL VARIABLE OF AN INTERNAL COMBUSTION ENGINE

FIELD OF THE INVENTION

The present invention relates to a method, a regulating system, and a computer program for regulating an actual output variable of an internal combustion engine to a reference variable.

BACKGROUND INFORMATION

Heavy vehicles, in particular commercial vehicles, are frequently equipped with a so-called engine brake to reduce or avoid overheating and wear of the mechanical wheel brakes during extended brake applications. A plurality of embodiments of the engine brake is known from the related art, e.g., a variable valve train or a decompression valve for blowing compressed air out of the cylinders of an internal combustion engine before the stored potential energy is again converted into kinetic energy. Further known from the related art is a throttle valve in the exhaust system of the internal combustion engine for increasing the exhaust gas backpressure, the internal combustion engine then operating as a pump against the exhaust gas pressure. Finally, in the case of turbochargers having variable turbine geometry, the exhaust gas backpressure can be increased by suitably activating the turbocharger.

An actuator is always necessary for operating the engine brake. The actuator cannot be positioned at any desired speed. If, after the engine brake is applied, the internal combustion engine is again operated, undesirably high exhaust gas pressures may arise in the exhaust tract, in particular in the case of a throttle valve and a turbocharger having variable turbine geometry. Excessively high pressure peaks may result in the destruction of the internal combustion engine or components in the exhaust system of the internal combustion engine. In particular, seals in the exhaust system may be destroyed or the throttle valve may be damaged; furthermore, excessively high exhaust gas backpressures may cause the exhaust valves to open and collide with the pistons, and in the case of turbochargers having variable turbine geometry, the turbocharger may be destroyed through excessive rotor speed.

In order to avoid too rapid a rise of the exhaust stream and accordingly of the exhaust gas (back) pressure until the engine brake is completely deactivated, the driver's torque request is delayed in engine brakes according to the related art. The delay of the driver's torque request means that even in the case of small driver inputs that do not result in any unacceptably high exhaust streams, the operating behavior is adversely affected because the responsiveness of the internal combustion engine is generally delayed between the time the engine brake is applied and the input of a new torque request by the driver.

SUMMARY OF THE INVENTION

The objective is achieved by a method for regulating an actual output variable of an internal combustion engine to a reference variable, a maximum value for the reference variable being generated as a function of at least one physical variable in the exhaust system of the internal combustion engine and the reference variable being limited to this maximum value. A first physical variable is preferably the actual value of an exhaust gas pressure. The exhaust gas pressure is preferably the measured or modeled static pressure or total pressure upstream from a flow element. A second physical variable is preferably the actual rotational speed of a turbocharger. The reference variable may be a torque and/or an injected fuel quantity and/or a rotational speed of the internal combustion engine. Preferably, it is provided that the maximum value for the reference variable is generated as a function of the operating parameters of the internal combustion engine. The function may also be stored as a characteristics map in a control unit. Preferably, it is provided that the operating parameters include values of the actual rotational speed and/or the setpoint rotational speed and/or the actual torque and/or the setpoint torque and/or the actual injected fuel quantity and/or the setpoint injected fuel quantity.

The method according to the present invention provides for determining a limitation of the power-determining reference variable, e.g., injected fuel quantity, torque, based on the acceptable exhaust gas pressure and for coordinating other reference variable limitations, e.g., the smoke limit, equivalently as a component protection. In addition to limiting the driver request, speed regulations, e.g., through the idle controller, cruising speed controller and the like, may not produce any undesirably high exhaust gas streams. Since the torque limitation of the method according to the present invention only takes effect if damage to the internal combustion engine or damage to the add-on assemblies is threatened, only in the case of torque requests that result in damage is the driving comfort impaired by a deviation of the torque actually provided by the internal combustion engine from the torque requested by the driver. In addition, the limitation according to the present invention also makes it possible to exclude unacceptably high exhaust gas streams when stationary; in particular, it is possible to operate the engine brake and the accelerator pedal simultaneously or implement underbraking of the idle controller using the engine brake. In the case of the known system, a stationary component protection is not ensured because the driver input is only delayed and is implemented without any limitation after the delay time.

The problem mentioned at the outset is also solved by a regulating system for regulating an actual output variable of an internal combustion engine to a reference variable, a maximum value for the reference variable being generated as a function of at least one physical variable in the exhaust system of an internal combustion engine and the reference variable being limited to this maximum value, as well as a computer program having program code for implementing all steps of the method according to the present invention when the program is executed on a computer.

DETAILED DESCRIPTION

Figure 1:
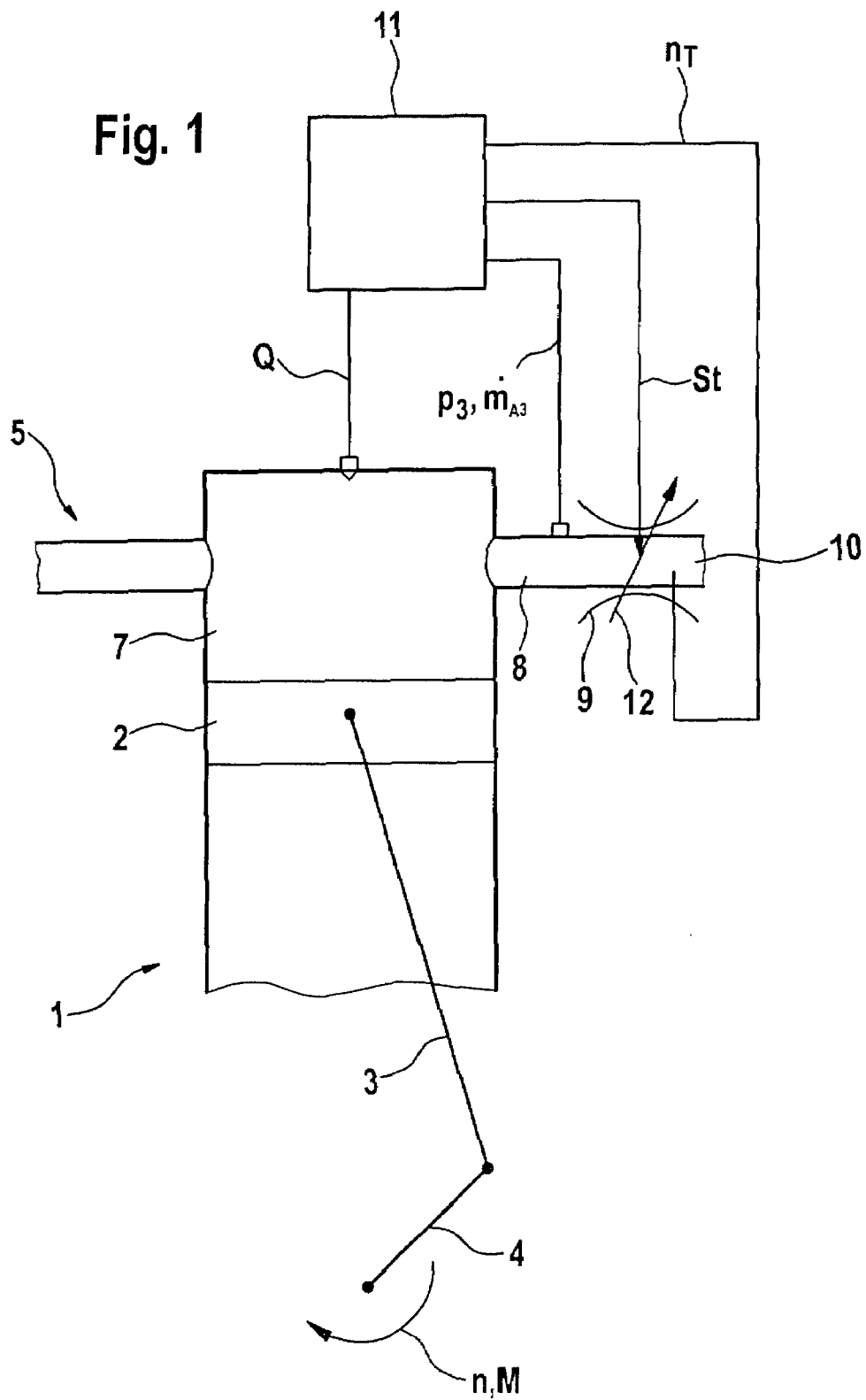
FIG. 1 shows a sketch of an internal combustion engine as a controlled system.

FIG. 1 shows a sketch of an internal combustion engine including a cylinder 1 in which a piston 2 is mounted movably back and forth in a combustion chamber 7. Piston 2 is connected to a crankshaft 4 via a connecting rod 3. The back and forth movements of piston 2 are converted into a rotational movement having rotational speed n and torque M of crankshaft 4. Cylinder 1 here represents one or a plurality of cylinders of an internal combustion engine of any design. The internal combustion engine includes an intake system 5 and an exhaust system 6. Exhaust system 6 includes an engine exhaust 26, which is connected to a flow element, in this case a throttle valve 9, via an exhaust manifold 8. Throttle valve 9 is connected to the environment via an exhaust 10 and, if necessary, additional flow elements which are not shown here, such as exhaust gas catalytic converters, additional turbocharger stages, or the like.

Throttle valve 9 as a flow element in the exhaust system of the internal combustion engine may be, for example, a controllable turbocharger, in particular a turbocharger having variable turbine geometry, or a controllable throttle, for example a controllable throttle valve. In the present exemplary embodiment, throttle valve 9 is used to increase the exhaust gas (back) pressure at engine exhaust 7. Increasing the exhaust gas pressure is intended to reduce the power output by the internal combustion engine, ideally to a negative value, so that the internal combustion engine operates in drag mode. This function is also described as engine brake.

Power P and rotational speed n of the internal combustion engine are regulated via fuel quantity Q injected in each injection event; for this purpose, supplied air quantity L is regulated and supplied fuel quantity Q is also regulated. In the present exemplary embodiment, a diesel engine is assumed; however, in principle other embodiments may also be considered, such as gasoline engines. The reference variable for regulating the rotational speed and power of the diesel engine is requested torque $M_{setpoint}$, from which injected fuel quantity Q is determined. Injected fuel quantity Q is controlled or regulated by a control unit 11. It is regulated insofar as a setpoint rotational speed $n_{setpoint}$ and setpoint torque $M_{setpoint}$ are specified and actual rotational speed $n_{actual}$ and actual torque $M_{actual}$ are regulated to the setpoint values by a controller. The injection device is not shown in FIG. 1; here, the injection event as such is merely represented schematically by an arrow denoted as Q. Pressure $p_3$ and mass flow rate $\dot{m}_{A3}$ are determined upstream from throttle 9. This may be done, for example, by a pressure sensor for measuring the static pressure, it also being possible to determine the mass flow rate by measuring the air mass in intake system 5 and determining injected fuel quantity Q, since the mass conservation law of course applies to the internal combustion engine. However, it is also possible to determine pressure $p_3$ upstream from throttle valve 9 and mass flow rate $\dot{m}_{A3}$ ($d/dt(m_{A3})$) indirectly via the operating condition of the internal combustion engine using a model which is stored in a control unit, for example by monitoring rotational speed n and torque M, as well as injected fuel quantity Q and position St of control element 12 of throttle 9.

Throttle valve 9 is shown schematically here, the control element for regulating the valve position having reference numeral 12. In a controllable throttle valve, control element 12 is, for example, the butterfly valve itself; in a controllable turbocharger, these may be, for example, adjustable blades.

If controllable throttling point 9 is a turbocharger, its rotational speed $n_T$, for example, may be measured in addition and made available to control unit 11.

Figure 2:
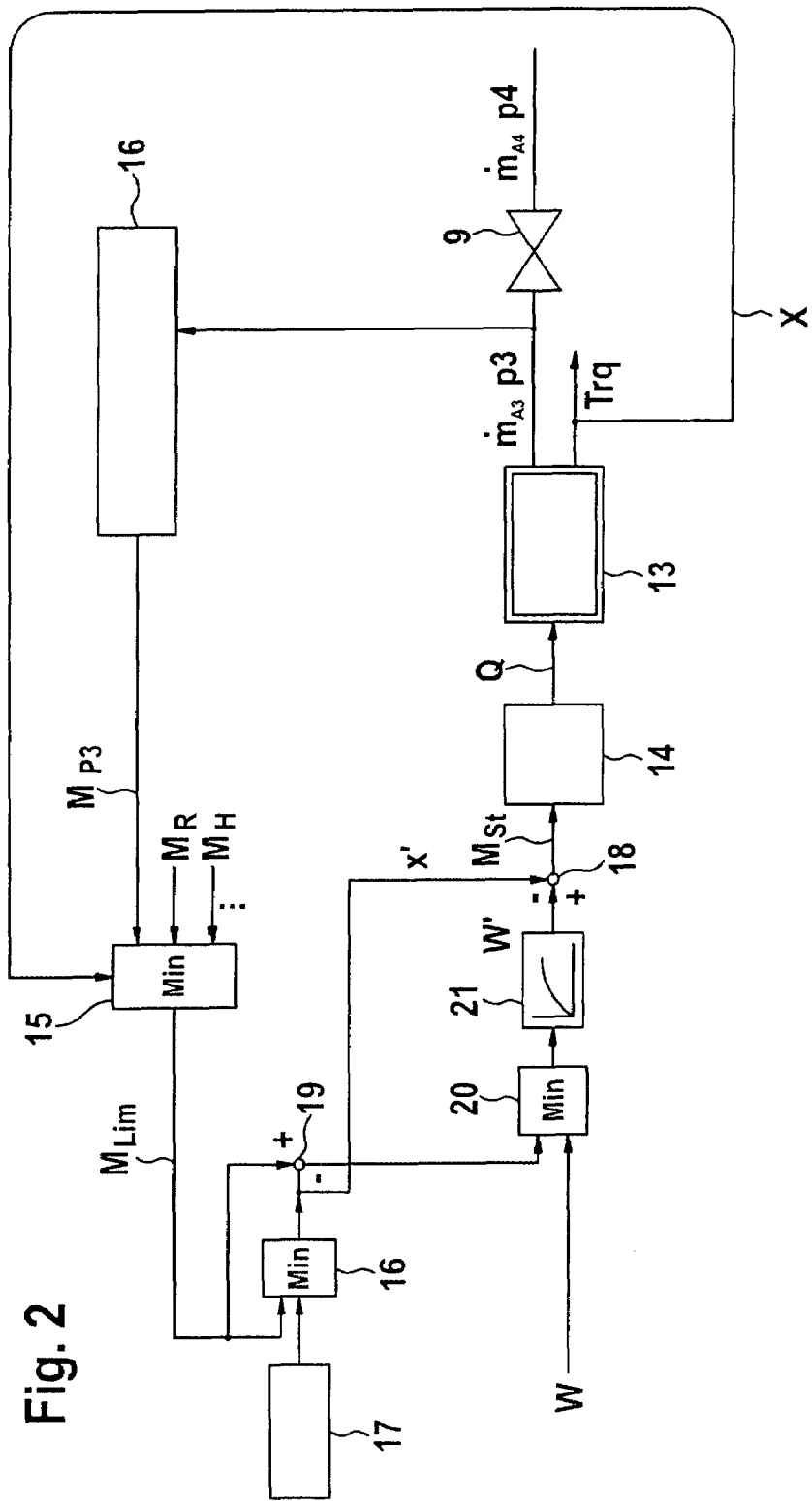
FIG. 2 shows an exemplary embodiment of a closed loop system according to the present invention.

FIG. 2 shows a sketch of a controller for an internal combustion engine. It is assumed that reference variable W is setpoint torque $M_{setpoint}$ of the internal combustion engine and controlled variable X is torque Trq output by internal combustion engine 13. The manipulated variable for internal combustion engine 13 is fuel quantity Q injected in each injection event. It is determined by a coordination element 14 for determining injected fuel quantities Q from a torque $M_{ST}$ for controlling injected fuel quantity Q. Control torque $M_{ST}$ is generated by subtracting modified reference variable W, the modified reference variable being denoted by W' in FIG. 2, and modified controlled variable X, which is denoted by X' in FIG. 2.

The control system in FIG. 2 shows a classic closed loop system, internal combustion engine 13 representing the controlled system, the coordination element for injection 14 being the controller and X or X' being the controlled variable and W or W' being the reference variable. The difference between X and X' is that modified controlled variable X' arises from controlled variable X through a limitation, controlled variable X thus being fed back with a limitation to a maximum value. In the feedback of controlled variable X a limiter 15 is situated which delivers the minimum from various torque limitations as limiting torque MLim. For example, a smoke limitation $M_R$, an overheating protection $M_H$, and the like may be included as limiting torques here. According to the present invention, also included are a limiting torque $M_{p3}$, which is determined from pressure $p_3$ at the engine exhaust or upstream from throttle valve 9 and from mass flow rate $\dot{m}_{A3}$ through internal combustion engine 13. A pressure limiting module 16 determines torque limitation $Mp_3$ from pressure $p_3$ or mass flow rate $\dot{m}_{A3}$ as a function of the operating point and feeds it forward to limiter parallel to the other torque limitations. "As a function of the operating point" here means in particular that additional parameters such as actual rotational speed $n_{actual}$, setpoint rotational speed $n_{setpoint}$, actual torque $M_{actual}$, setpoint torque $M_{setpoint}$, actual rotational speed $n_{T-actual}$ of a turbocharger, setpoint rotational speed $n_{T-setpoint}$ of a turbocharger, actual injected fuel quantity $Q_{actual}$, setpoint injected fuel quantity $Q_{setpoint}$, and the like may be included in the determination of torque limitation $Mp_3$.

Torque limitation $Mp_3$ as a maximum value of reference variable W is generated as a function of the parameters $M_{P3}$=f(n, Q, $\dot{m}_{A3}$, p3 . . . ), which are stored in a control unit as a function or as a characteristics map. Since the torque limitation to $Mp_3$ takes effect in particular in the transient changeover from coasting mode (torque output by the internal combustion engine less than or equal to zero) of the internal combustion engine to propelling mode (torque output by the internal combustion engine greater than zero), the values after transition into driving operation may be used as setpoint values of setpoint rotational speed $n_{setpoint}$, setpoint torque $M_{setpoint}$, setpoint rotational speed $n_{T-setpoint}$ of a turbocharger, and setpoint injected fuel quantity $Q_{setpoint}$; the actual values of actual rotational speed $n_{actual}$, actual torque $M_{actual}$, actual rotational speed $n_{T-actual}$ of a turbocharger, and actual injected fuel quantity $Q_{actual}$ may be continuously redetermined during the transition.

The output of limiter 15 is connected to the input of an additional limiter 25, at which, furthermore, the signal of a speed controller 17 is present (as torque). The output of additional limiter 25 is connected to a summing point 18 having a minus sign. The output of additional limiter 25 is furthermore connected to a summing point 19 having a minus sign, the output of limiter 15 having a plus sign furthermore being connected to summing point 19. This difference is placed at a third limiter 20, at which reference variable W, i.e., driver's desired torque $M_w$, is also placed. The output of third limiter 20 is connected to summing point 18 via a reference generator 21 having a plus sign. The reference generator maps a signal at its input a onto a signal b at its output as function b=f(a) ab.

Figure 3:
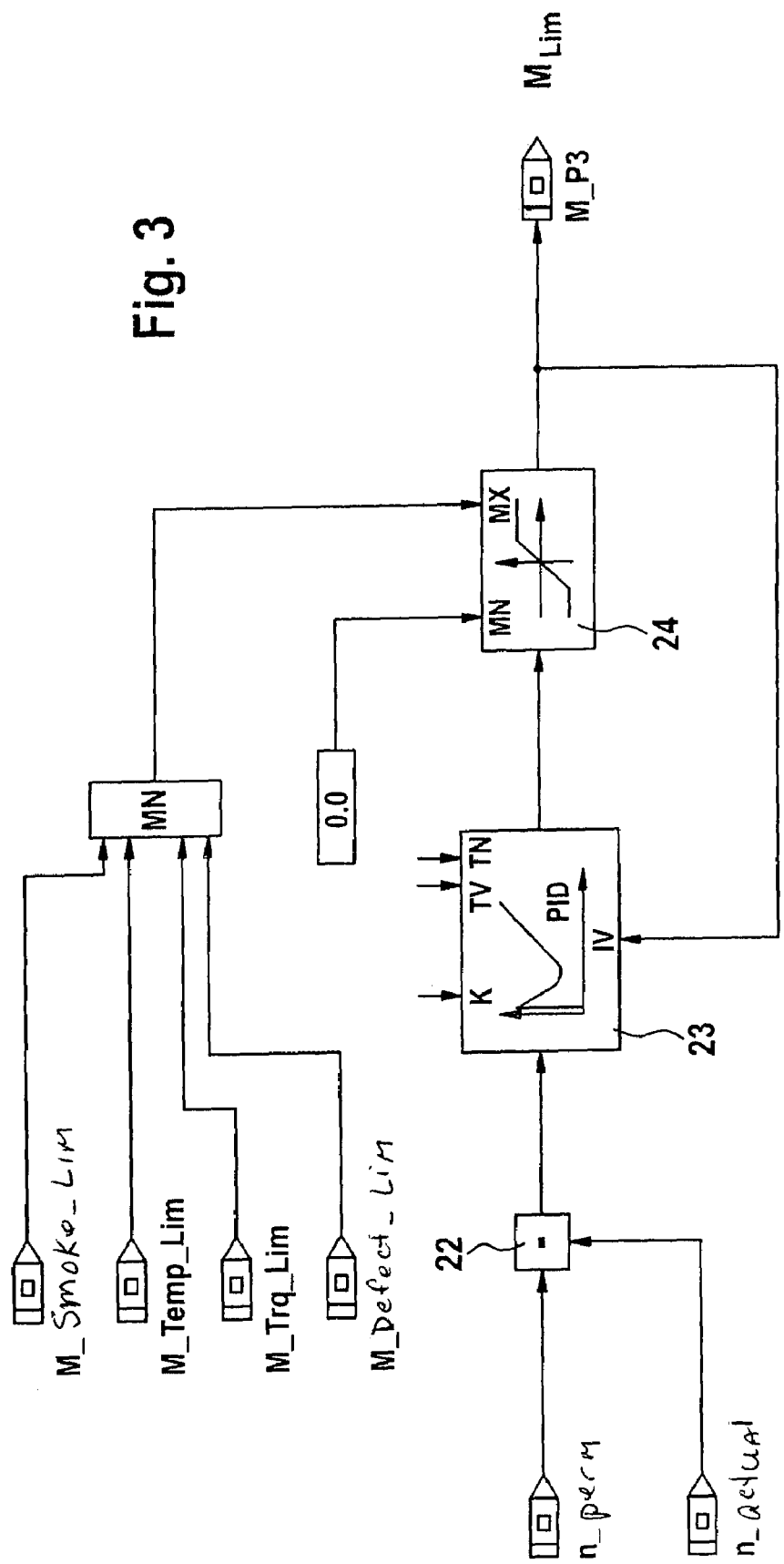
FIG. 3 shows a first exemplary embodiment of a part of a closed loop system according to the present invention.

FIG. 3 shows a part of a closed loop system for an internal combustion engine having a controllable turbocharger as throttle valve 9. The turbocharger includes a facility for measuring turbocharger actual rotational speed n_actual. Also known for the turbocharger is permissible rotational speed n_perm. Limiting torque $M_{Lim}$ is now determined from both data. The difference from permissible rotational speed n_perm and actual rotational speed n_actual of the turbocharger is subtracted using a subtractor 22 and placed at the input of a PID controller 23. Its output is limited by a limiter 24 and delivers limiting torque $M_{Lim}$. In the present case, the value zero is fed forward to limiter 24 as minimum variable MN; the minimum from various additional limiting torques such as smoke limit M_Smoke_Lim, a temperature limitation M_Temp_Lim, a maximum torque limitation M_Trq_Lim, and a torque limitation for preventing defects M_Defect_Lim is fed forward as maximum value MX. Limiting torque M_P3 present at the output of the block diagram of FIG. 3 corresponds to the limiting torque present at the output of limiter 15 in FIG. 2. The entire assembly made up of limiter 15 and limiter 16 in FIG. 2 may thus be replaced by the subcontroller according to FIG. 3.

Figure 4:
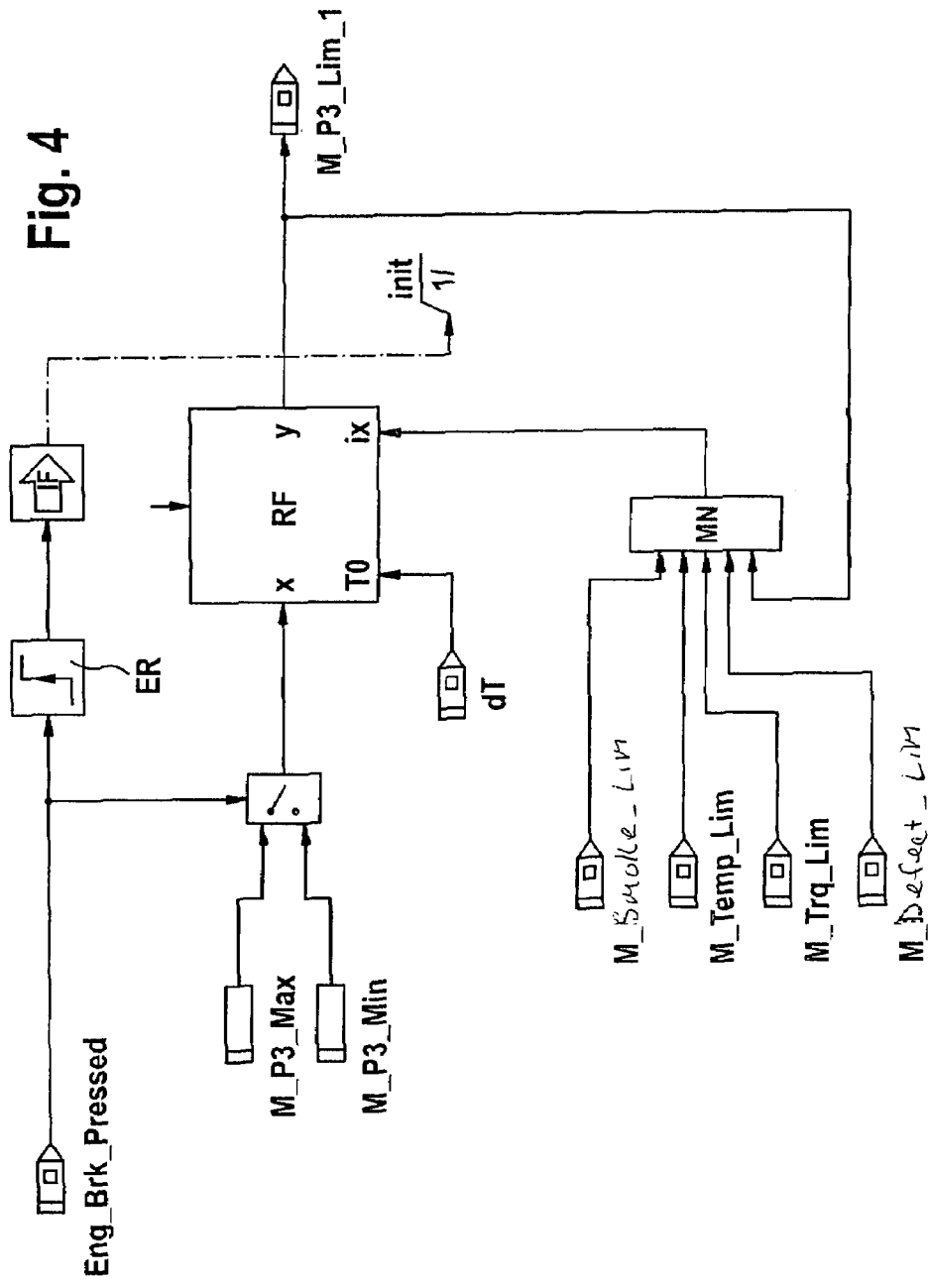
FIG. 4 shows a second exemplary embodiment of a part of a closed loop system according to the present invention.

FIG. 4 shows an alternative design of pressure limiting module 16 of the closed loop system. In this case it is assumed that throttle 9 is not activated by the engine controller but instead by an independent switch of which only the switch position is known in the engine control unit. In this case, the maximum pressure is ramped up.

The circuit component of FIG. 4 replaces pressure limiting module 16 in FIG. 2. When the engine brake is applied, the limiting value for activated engine brake (M_P3_MIN) is ramped up to the output of pressure limiting module 16 (M_P3_Lim1) starting from the current limiting value (output MN element in FIG. 4). When the engine brake is released, the limiting value for a deactivated engine brake (M_P3_MAX) is ramped up to the output of pressure limiting module 16 (M_P3_Lim1) starting from the current limiting value (M_P3_Lim1).

What is claimed is:

1. A regulating system for regulating an actual output variable of an internal combustion engine to a reference variable, comprising:
    a generating arrangement to generate a maximum value for the reference variable as a function of at least one physical variable in an exhaust system of the internal combustion engine, and limiting the reference variable to the maximum value, wherein the reference variable is at least one of a torque, an injected fuel quantity, and a rotational speed of the internal combustion engine; and
    a regulating arrangement to regulate the actual output variable of the internal combustion engine to the reference variable.

2. A computer readable medium having a computer program, which is executable by a processor, for regulating an actual output variable of the internal combustion engine to a reference variable, comprising:
    a program code arrangement having program code for performing the following:
    generating a maximum value for the reference variable as a function of at least one physical variable in an exhaust system of the internal combustion engine;
    limiting the reference variable to the maximum value, wherein the reference variable is at least one of a torque, an injected fuel quantity, and a rotational speed of the internal combustion engine; and
    regulating the actual output variable of the internal combustion engine to the reference variable.

3. A method for regulating an actual output variable of an internal combustion engine to a reference variable, the method comprising:
    generating a maximum value for the reference variable as a function of at least one physical variable in an exhaust system of the internal combustion engine;
    limiting the reference variable to the maximum value, wherein the reference variable is at least one of a torque, an injected fuel quantity, and a rotational speed of the internal combustion engine; and
    regulating the actual output variable of the internal combustion engine to the reference variable.

4. The method of claim 3, wherein a first physical variable is an actual value of an exhaust gas pressure.

5. The method of claim 3, wherein the exhaust gas pressure is one of a measured static pressure, a modeled static pressure, and a total pressure upstream of a flow element.

6. The method of claim 3, wherein a second physical variable is an actual rotational speed of a turbocharger.

7. The method of claim 3, wherein the maximum value for the reference variable is generated as a function of operating parameters of the internal combustion engine.

8. The method of claim 3, wherein the operating parameters include values of at least one of an actual rotational speed, a setpoint rotational speed, an actual torque, a setpoint torque, an actual injected fuel quantity, and a setpoint injected fuel quantity.

* * * * *